July 19, 1927.
A. G. HARTUNG
1,636,633
TENSOR SYSTEM
Filed July 10, 1925
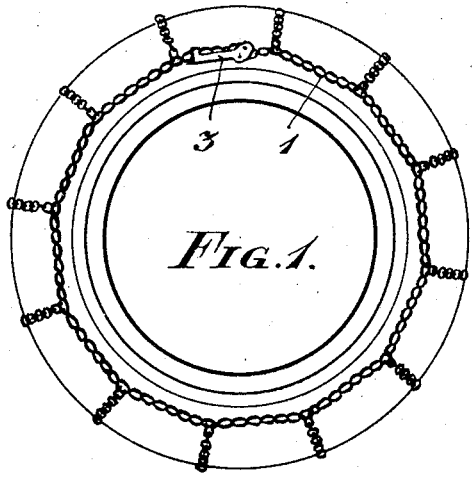
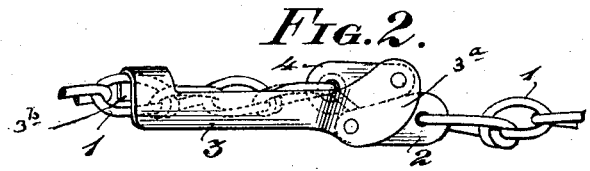
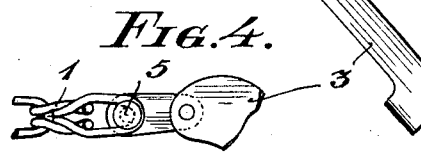
INVENTOR
ADALBERTA G. HARTUNG
BY
ATTORNEYS Patented July 19, 1927.

1,636,633

UNITED STATES PATENT OFFICE.

ADALBERTO GUALTERIO HARTUNG, OF BUENOS AIRES, ARGENTINA.

TENSOR SYSTEM.

Application filed July 10, 1925. Serial No. 42,780.

This present descriptive specification refers to a tensor system, the purpose of which is to contract the lateral chains of non-skid outfits of cables or chains which are at present applied to automobile tyres, with the object of facilitating their passage over boggy, sandy or snowy patches of ground.

As will be seen further on, the tensor lock, the object of this application, is adaptable to any type of chain whatsoever and can be put into action rapidly and easily, producing a powerful tension in the chains by means of the special lever combination by which the stretching is effected.

The whole of the lock is suitably fixed at one extremity of the chain, and for its working it is hooked on to the opposite end, the small lever being moved until its extremity, which is bent in the shape of a hook, remains held by the chain itself under tension.

This is brought about by the moving of the hook reversing the position of the points at which are attached the hooks at the end of the lock system, to which the chains are fixed.

To make this specification more clear, drawings are attached as follows:—

Fig. 1 shows an ordinary chain to which has been attached to tensor lock, constructed in accordance with our invention.

Figs. 2 and 3 show the tensor lock closed and open respectively.

Fig. 4 is a variant in the construction, showing the adoption of a projecting stud for the hook at the extremity of the chain or cable, in substitution of the previous notch or hook.

In these drawings (1) is the extremities of the lateral cable or chain, at one of which the piece (2) is fixed, suitably linked up with the lever (3), in combination with the hook (4), which is similarly linked up with the same. The lever 3 has its end 3ª to which the hooks are pivoted offset and is provided at the other end with a hook 3ᵇ for engaging the chain as shown in Fig. 2. The piece (2) may take the form of a hook, as in Figs. 2 and 3, or may be a projecting stud (5), or whatsoever other means that will permit of its hooking on to the extremity of the chain or cable.

Having thus described and specified the character of my invention, and the method of applying it, I claim as my exclusive invention and property:—

A tension device for the chains of automobile tyres, comprising a lever having an enlarged and laterally offset end and two hooks pivoted to the enlarged end of the lever to extend in opposite directions, the hooks being pivoted to the same side of the offset end of the lever and lying in different vertical planes from the plane of the body of the lever, the other end of the lever having a rigid lateral hook extending in the same direction as the enlarged offset end of the lever, said hook being adapted to rest upon the chain and extend down the side of the same at a point remote from the engagement of the pivoted hook with the chain and secure the said lever to the chain.

ADALBERTO GUALTERIO HARTUNG.